Jan. 14, 1969 B. C. EGAN, JR 3,421,259
STORM SHUTTERS
Filed Aug. 19, 1966 Sheet 1 of 3
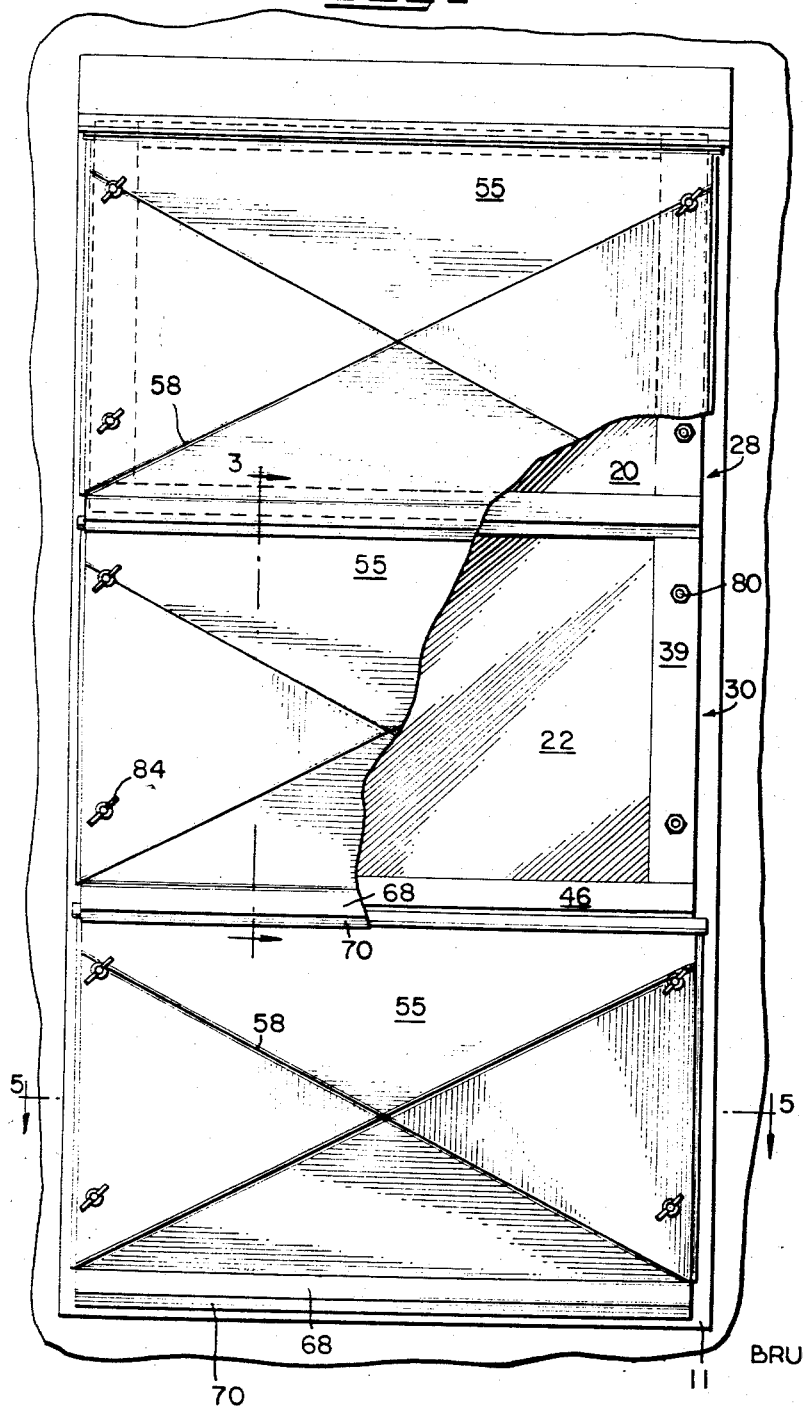
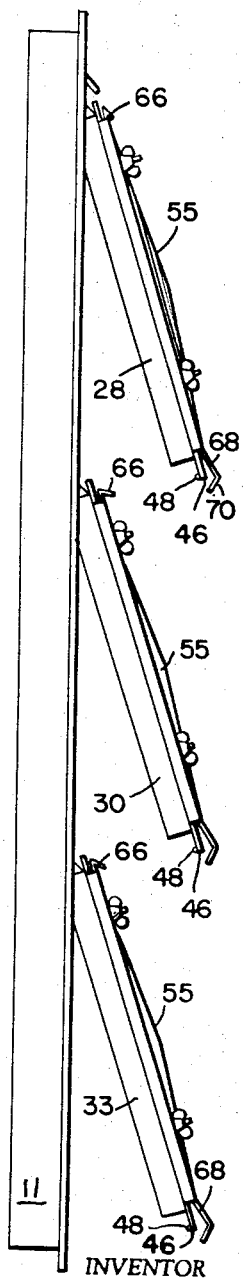
INVENTOR
BRUCE C. EGAN, JR.
BY McCarthy, DePaoli & O'Brien
ATTORNEY

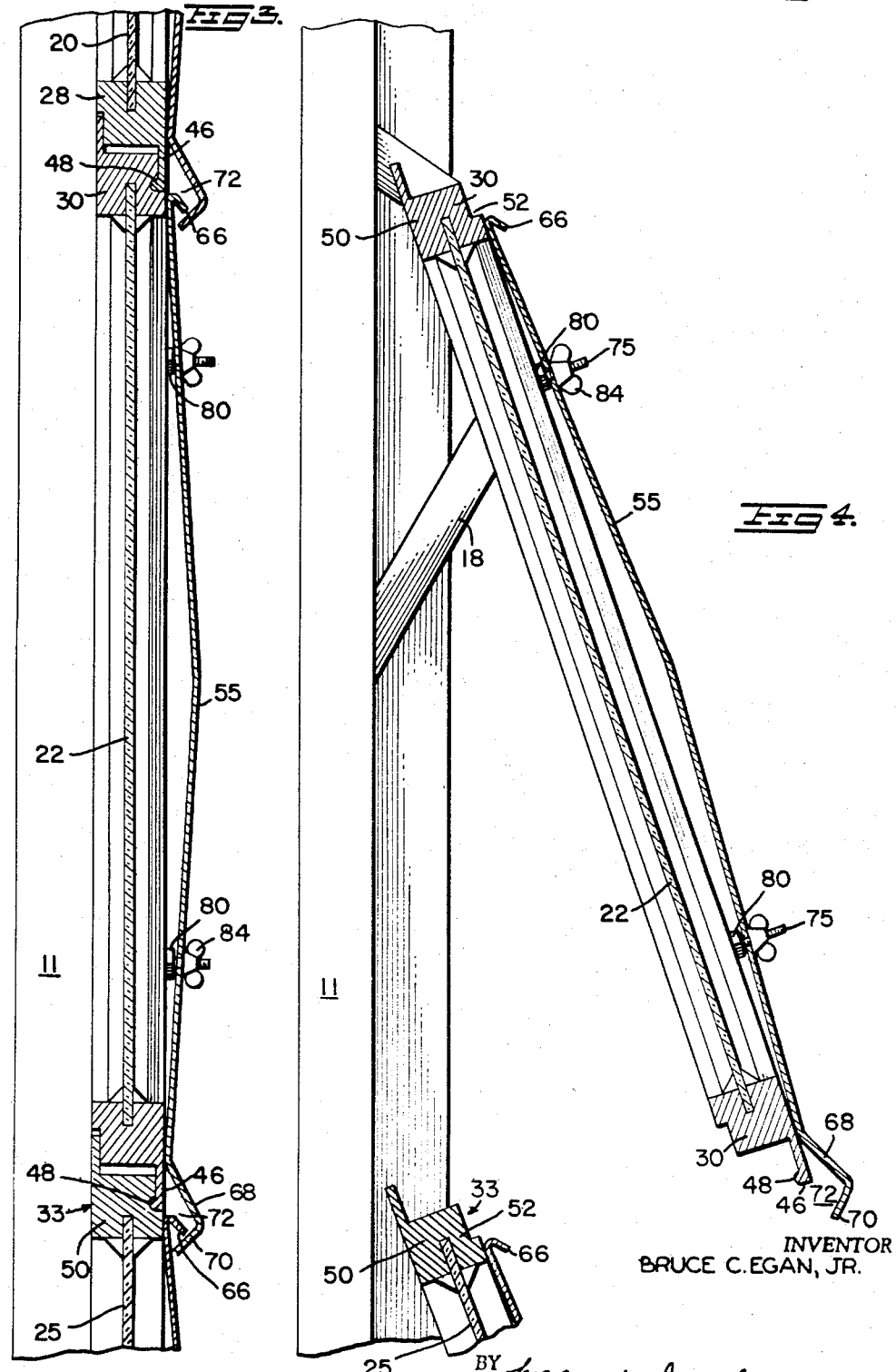

Jan. 14, 1969          B. C. EGAN, JR          3,421,259
                         STORM SHUTTERS
Filed Aug. 19, 1966                        Sheet 3 of 3
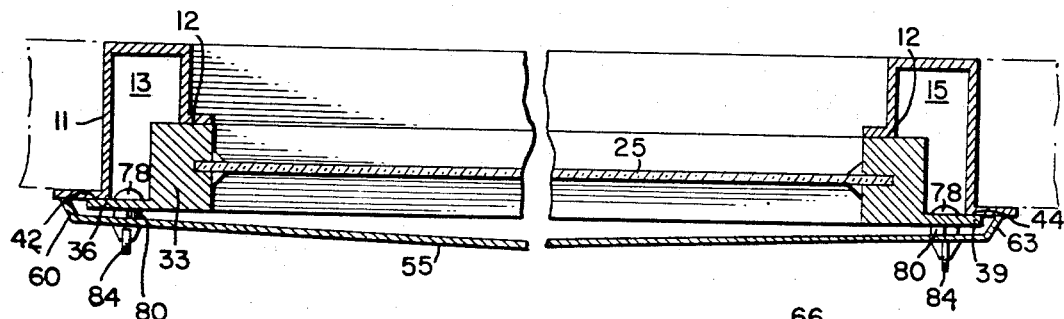
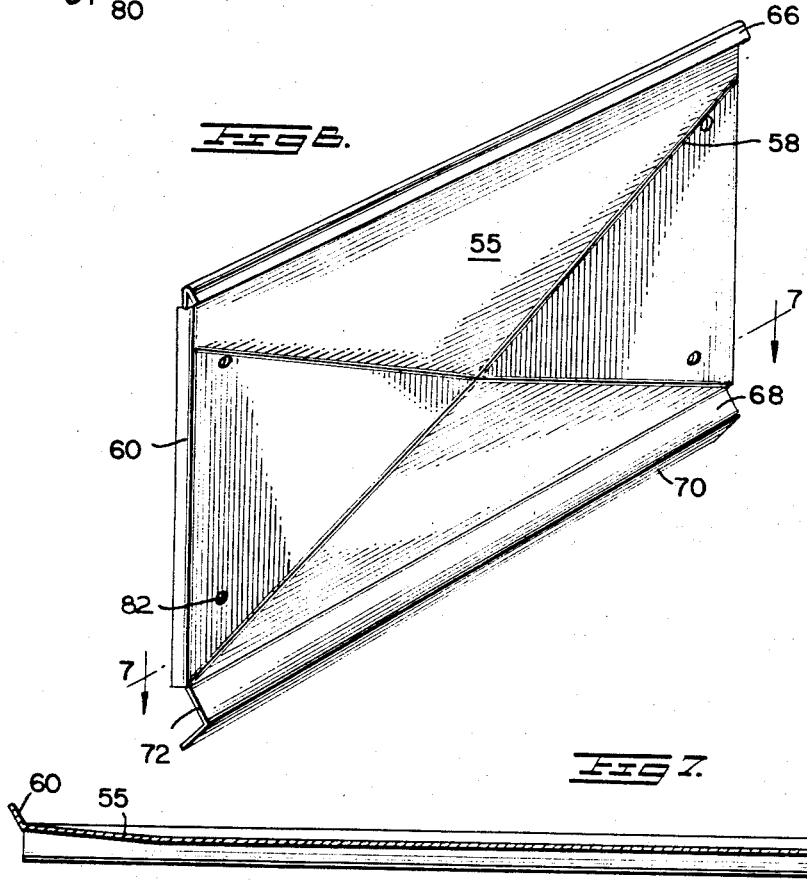
INVENTOR
BRUCE C. EGAN, JR.
BY *McCarthy DePaoli & O'Brien*
ATTORNEY United States Patent Office 3,421,259
Patented Jan. 14, 1969

3,421,259
STORM SHUTTERS
Bruce C. Egan, Jr., Fort Lauderdale, Fla., assignor to Broward Hurricane Panel Co., Inc., a corporation of Florida
Filed Aug. 19, 1966, Ser. No. 573,583
U.S. Cl. 49—62           8 Claims
Int. Cl. E06b 3/30

ABSTRACT OF THE DISCLOSURE

A storm shutter has a pyramidal body and side portions which bear sealingly against the window frame. The tension thus created on the shutter prevents rattling during wind storms.

---

This invention pertains to storm shutters and more particularly to an exceptionally strong, lightweight, storm shutter which can be quickly secured or removed in a detachable manner to swinging windows of the casement or jalousie type.

The rain and wind which accompanies severe storms such as hurricanes and tornadoes cause untold property damage, particularly in southern areas of the United States. In view of the prevalence of such storms it is imperative that private homes and apartments as well as hotels and other commercial buildings have some type of storm shutters which can be easily handled and quickly secured in a minimum of time. Such shutters should take little storage space and must be extremely strong to withstand high wind pressures. The shutter must offer positive protection for the windows against wind-carried debris and should aid, if possible, the water-tight features built into most jalousie or casement windows, or at least not detract from the effectiveness of such features. Also, of course, the shutter should not interfere with opening and closing of the swinging window. Since some buildings will require the use of many such shutters, it is important that vibration of the shutters with a consequent chattering noise be minimized. No shutters provided in the art have proven to be completely satisfactory in all these respects. For example, many of the storm shutters of the art detract from the normal sealing features of the unshuttered window.

This invention provides a storm shutter which is structurally strong, durable and lightweight and which occupies little storage space. The shutter of this invention is designed to withstand extreme pressure conditions without buckling and interferes neither with the normal sealing features of the window nor with the opening and closing of the window. The shutter of this invention can be quickly attached and removed.

The invention will be better understood by reference to the accompanying drawings, which are to be considered illustrative only and not limiting, and in which FIGURE 1 is a front elevational view, partly broken away, of a jalousie window having the storm shutter of this invention fastened thereto;

FIGURE 2 is a side elevational view of the window and shutters;

FIGURE 3 is an enlarged fragmentary detail section along the line 3—3 of FIGURE 1;

FIGURE 4 is a view similar to FIGURE 3 with the window in open position;

FIGURE 5 is an enlarged fragmentary detail section along the line 5—5 of FIGURE 1;

FIGURE 6 is a perspective view of a detached shutter; and

FIGURE 7 is a detail sectional view along the line 7—7 of FIGURE 6.

In the figures, the window comprises a plurality of what may be considered as typical jalousie window sections. The window will generally have a stationary frame 11 which is set into the opening in the wall of the building and may be made of conventional materials, e.g., extruded aluminum, and be provided with weatherstripping, such as 12. This stationary frame often is provided with the lengthwise channels 13, 15 on each side, within which the opening and closing operators, e.g., the lever arm 18 operate.

The panes of glass 20, 22 and 25 are held within the movable frames 28, 30 and 33. These movable frames generally are provided with features designed to keep out outside moisture. Among such elements are the side flanges 36 and 39 which may have the sealing beads 42 and 44. Often the bottom flange 46 will also be provided with a bead 48. As you can see, each bottom flange 46 bears against the top frame-member 50 of the next lowermost movable frame when the window is closed. To further this sealing effect the top frame-member 50 may be provided with the cut-out portions 52 into which the flanges 46 fit when the window is closed.

The storm shutter of tihs invention comprises the slightly pyramidal, preferably sheet metal, body 55. This body advantageously has four sloping portions which meet at the creases 58. The body portion 55 has an area at least as large as the area of the glass portions 20, 22 and 25 and preferably is wide enough to cover the side frame-members and flanges 36 and 39. The four edges of the body portion 55 may all be substantially in the same plane and in some instances it may be desirable for these edges to closely and sealingly contact at least the top and bottom sides, e.g., at the flanges, of the movable frame members 28, 30 and 33. Generally the side edges of the body 55 will not sealingly contact the sides of the movable framing members, thus providing for a little air movement, e.g., sufficient to equalize the air pressure on both sides of the installed storm shutter.

The side edges of the body 55 are bent rearwardly of the apex of the pyramid as shown at 60 and 63 and, as can be seen from FIGURE 5, are in close and tight engagement with the stationary frame 11 when the jalousie is closed. This close engagement acts as a further seal for preventing entry of water and wind from the sides of the window and also serves to put the body 55 in a state of slight tension, thereby increasing its rigidity and resistance to wind and preventing vibration and chattering.

At its top, the sheet metal of the body is bent forward as the flange 66 and at its bottom, which carries the backwardly-bent flange 70. Flanges 68 and 70, together, extend below the body 55 for a length greater than the extension of the lower frame flange 46. Flanges 68 and 70 have an outward extension sufficient to provide a channel 72 which substantially encloses the upper flange 66 of the next lowermost shutter when the window is closed, as shown most clearly in FIGURE 3. It will be observed that in the closed position, the channel 72 provides a very tortuous path for any upward air currents, thus minimizing the amount of water which can be driven upwardly toward the window pane. Also, it is clearly shown in FIGURE 3 that the over-lapping of adjacent upper and lower shutters gives a clear drainage path for rain, carrying the rain past the juncture of the upper edge of the body 55 with the upper movable framing member 50.

A number of alternative ways to fasten the shutter to the window are possible, but the means illustrated is preferred. The side flanges 36 and 39 of each movable frame member are provided with holes through which the bolts 75 pass, with the heads, 78 of the bolts on the inside, in the channels 13 and 15. Outside the flanges 36 and 39, the spacing members 80 are provided. These advantageously may be hex-head or other nuts, which allow the bolts to be kept fastened to the flanges 36 and 39 throughout the year, or at least throughout the hurricane season, even when the shutters are not in use, so that the shutters may be quickly installed by placing the bolts 75 in the holes 82 in the body 55 and may be fastened on by any suitable means such as, for example, the wing nuts 84.

It can be seen that this invention provides a storm shutter for swinging windows which is compact and easy to store, readily installable when needed, able to provide positive sealing and rigidity by means of its pyramidal shape, and able to be held under tension, and which does not interfere in any way with the sealing features provided in the swinging window-frame itself, but rather adds a second sealing effect.

What is claimed is:

1. In combination with a swinging window having a stationary frame and a plurality of movable members framing glass panes, a storm shutter comprising a pyramidal sheet body having an area greater than the area of said pane and a width sufficient to cover the side portions of said movable framing members, and means connecting said shutter to a said movable framing member, said shutter having straight side portions extending rearwardly from the side of said body at an obtuse angle thereto a distance sufficient to sealingly engage the sides of said stationary frame and put the said shutter body in a state of tension when the window is closed.

2. The combination of claim 1 in which the shutter is provided with a top flange and a bottom flange, said bottom flange providing a channel sufficient to substantially enclose the top flange of the next lowermost shutter when the window is closed.

3. The combination of claim 2 in which said top flange is bent downwardly whereby when it is enclosed by said bottom flange a tortuous path is provided for upward air currents.

4. The combination of claim 1 in which the top and bottom edges of said body sealingly engage the top and bottom sides of said movable framing member.

5. The combination of claim 1 in which the shutter is fastened to the said movable framing member by fastening means which pass through the front of said framing member and the pyramidal body of said shutter.

6. The combination of claim 5 in which spacing members are provided between said framing member and said pyramidal body.

7. The combination of claim 6 in which the spacing members serve to hold the said fastening means to said framing member.

8. The combination of claim 7 in which said fastening means are at the side portions of the said movable framing member.

References Cited

UNITED STATES PATENTS

| | | | |
|---|---|---|---|
| 2,012,388 | 8/1935 | Goodman | 49—62 X |
| 2,170,110 | 8/1939 | Booth | 49—62 |
| 2,627,951 | 2/1953 | Mitchell | 49—62 |
| 2,631,698 | 3/1953 | Buckwalter | 49—62 |
| 3,026,579 | 3/1962 | Carter | 49—62 |

DAVID J. WILLIAMOWSKY, *Primary Examiner.*

J. KARL BELL, *Assistant Examiner.*

U.S. Cl. X.R.

52—203